United States Patent
Smith et al.

(10) Patent No.: US 11,377,083 B2
(45) Date of Patent: Jul. 5, 2022

(54) ELECTROMECHANICAL ACTUATOR PACKAGE FOR ACTUATING BRAKE ASSEMBLY

(71) Applicant: MANDO CORPORATION, Gyeonggi-do (KR)

(72) Inventors: Daniel Alan Smith, White Lake, MI (US); Galus Chelaidite, South Lyon, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 140 days.

(21) Appl. No.: 16/666,339

(22) Filed: Oct. 28, 2019

(65) Prior Publication Data

US 2020/0156611 A1    May 21, 2020

Related U.S. Application Data

(60) Provisional application No. 62/768,035, filed on Nov. 15, 2018.

(51) Int. Cl.
*F16D 65/18* (2006.01)
*B60T 13/74* (2006.01)
(Continued)

(52) U.S. Cl.
CPC ............ *B60T 13/746* (2013.01); *B60T 1/065* (2013.01); *B60T 8/282* (2013.01); *B60T 13/741* (2013.01); *B62D 5/046* (2013.01); *B62D 5/0442* (2013.01); *B62D 15/021* (2013.01); *F16D 65/0979* (2013.01); *F16D 65/16* (2013.01);
(Continued)

(58) Field of Classification Search
CPC ............ F16D 2121/24; F16D 2127/06; F16D 2125/50; F16D 2129/08; F16D 65/18; F16D 63/006; F16D 65/0975; F16H 2048/104; F16H 2001/2872; F16H 3/72; F16H 9/04
See application file for complete search history.

(56) References Cited

U.S. PATENT DOCUMENTS

| | | | |
|---|---|---|---|
| 6,412,608 B1 * | 7/2002 | Mohr | F16D 65/14 188/156 |
| 6,695,100 B1 * | 2/2004 | Yocum | F16D 51/48 188/79.63 |

(Continued)

*Primary Examiner* — Bradley T King
*Assistant Examiner* — Stephen M Bowes
(74) *Attorney, Agent, or Firm* — Ladas & Parry, LLP

(57) ABSTRACT

An electromechanical actuator package for actuating a brake assembly configured to operate a vehicle brake comprises: a motor; a differential operably connected to the motor, the differential comprising a pulley and an output connectable to the brake assembly; and a locking mechanism configured to lock the pulley of the differential, the locking mechanism comprising: a base configured to be movable, a plurality of projections projecting from the movable base, the projections comprising first and second projections, wherein at least a part of the pulley is positioned between the first and second projections projected from the movable base, an electromagnet assembly disposed adjacent to at least one of the projections, the electromagnet assembly operably associated with at least one of the projections, and one or more springs operably coupled to the movable base and/or at least one of the projections.

19 Claims, 15 Drawing Sheets

(51) Int. Cl.

| | |
|---|---|
| *B60T 1/06* | (2006.01) |
| *B60T 8/28* | (2006.01) |
| *B62D 5/04* | (2006.01) |
| *B62D 15/02* | (2006.01) |
| *F16D 65/097* | (2006.01) |
| *F16D 65/16* | (2006.01) |
| *G01B 7/315* | (2006.01) |
| *H02K 1/14* | (2006.01) |
| *H02K 1/276* | (2022.01) |
| *H02K 21/16* | (2006.01) |
| *H02K 29/03* | (2006.01) |
| *F16D 55/14* | (2006.01) |
| *F16D 121/24* | (2012.01) |
| *F16D 125/50* | (2012.01) |
| *F16D 127/06* | (2012.01) |

(52) U.S. Cl.
CPC ............. *G01B 7/315* (2013.01); *H02K 1/146* (2013.01); *H02K 1/2766* (2013.01); *H02K 21/16* (2013.01); *H02K 29/03* (2013.01); *F16D 55/14* (2013.01); *F16D 2121/24* (2013.01); *F16D 2125/50* (2013.01); *F16D 2127/06* (2013.01)

(56) References Cited

U.S. PATENT DOCUMENTS

| | | | |
|---|---|---|---|
| 9,874,258 B2 * | 1/2018 | Lee | F16D 65/18 |
| 2006/0032712 A1 * | 2/2006 | Kollaard | F16D 28/00 |
| | | | 188/72.8 |
| 2015/0041261 A1 * | 2/2015 | Masuda | F16D 65/18 |
| | | | 188/163 |
| 2016/0017942 A1 * | 1/2016 | Kwon | F16D 65/18 |
| | | | 188/162 |
| 2016/0076607 A1 * | 3/2016 | Yasui | F16D 65/18 |
| | | | 188/69 |
| 2016/0327104 A1 * | 11/2016 | Li | F16D 65/0006 |
| 2017/0321772 A1 * | 11/2017 | Lee | F16D 65/18 |
| 2018/0045255 A1 * | 2/2018 | Chelaidite | B60T 13/741 |
| 2018/0066740 A1 * | 3/2018 | Lee | F16H 37/0833 |
| 2018/0135710 A1 * | 5/2018 | Sala | B60T 13/741 |

* cited by examiner

ELECTROMECHANICAL ACTUATOR PACKAGE FOR ACTUATING BRAKE ASSEMBLY

CROSS REFERENCE TO PARENT AND/OR RELATED APPLICATION(S)

This application claims the benefit of U.S. Patent Application Ser. No. 62/768,035, filed on Nov. 15, 2018, entitled "RACK POSITION SENSOR; VARIABLE LAMINATIONS STACKED AXIALLY TO REDUCE THE TORQUE RIPPLE AND COGGING TORQUE OF ELECTRIC MOTORS; SPINDLE NUT SOFT STOP FOR MOC BRAKE PAD SERVICE RELEASE FUNCTION; INTERNAL GEAR UNIT BRAKE; STEPPED PISTON WITH STEEL FOOTING ASSEMBLY FOR HD TRUCK MOC; PLANETARY HARMONIC GEAR", which is all hereby incorporated herein by reference in its entirety.

BACKGROUND

Various embodiments of the present disclosure relate to an electrically actuated brake system and, in particular, to an electromechanical actuator package for driving a brake assembly, for example, but not limited to, a brake caliper.

A brake system for a motor vehicle, and in particular an automotive vehicle, functionally reduces the speed of the vehicle or maintains the vehicle in a rest position. Various types of brake systems are commonly used in automotive vehicles, including hydraulic, anti-lock or "ABS," and electric or "brake by wire." For example, in a hydraulic brake system, the hydraulic fluid transfers energy from a brake pedal to a brake pad for slowing down or stopping rotation of a wheel of the vehicle. Electronics control the hydraulic fluid in the hydraulic brake system. In the electric brake system, the application and release of the brake is controlled by an electric caliper via electrical signal.

These electric brake systems typically include an electromechanical actuator connected to a brake caliper either by a cable, as the drum in head, or directly attached to the brake caliper. The actuator converts electrical power to rotational mechanical output power for moving the cable or drive screw and applying the brakes. Generally, the electro-mechanical actuator includes a motor and a gear/belt system. Typically, either a few large gears or many small gears for the gear system, one or more belts for the belt system or combination thereof are needed to achieve the necessary load transfer.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

Accordingly to some embodiments of the present disclosure, an electromechanical actuator package for actuating a brake assembly configured to operate a vehicle brake may comprise: a motor; a differential operably connected to the motor, the differential comprising a pulley and an output connectable to the brake assembly; and a locking mechanism configured to lock the pulley of the differential, the locking mechanism comprising: a base configured to be movable, a plurality of projections projecting from the movable base, the projections comprising a first projection and a second projection, wherein at least a part of the pulley is positioned between the first and second projections projected from the movable base, an electromagnet assembly disposed adjacent to at least one of the projections, the electromagnet assembly operably associated with at least one of the projections, and one or more springs operably coupled to the movable base and/or at least one of the projections.

The base of the locking mechanism may be configured to be rotatable such that rotation of the base can cause the first and second projections of the locking mechanism to engage or disengage with the pulley of the differential.

The one or more springs may be configured to urge at least one of the projections toward the pulley of the differential. The electromagnet assembly may be configured to move at least one of the projections away from the pulley of the differential by applying electromagnetic field to at least one of the projections. For example, the one or more springs may be configured to rotate the base and/or at least one of the projections in a first direction engaging at least one of the projections with the pulley of the differential. The electromagnet assembly may be configured to rotate the base and/or the at least one of the projections in a second direction different from the first direction to disengage at least one of the projections from the pulley of the differential.

The first projection of the locking mechanism may be positioned outside of the pulley of the differential and the second projection of the locking mechanism may be positioned under or above the pulley of the differential.

One end of one of the springs may be coupled to a groove formed on the base of the locking mechanism and another end of the one of the springs may be coupled to a hole formed in a housing of the electromechanical actuator package.

The electromagnet assembly may comprise a core and a coil. The core of the electromagnet assembly may comprise arms, and at least one of the projections may be positioned between the arms of the core of the electromagnet assembly. The electromagnet assembly may be electrically wired in parallel with the motor.

The electromechanical actuator package may further comprise a circuit configured to supply power to the electromagnet assembly. The one or more springs may be configured to rotate the base or at least one of the projections of the locking mechanism in a first direction engaging at least one of the projections of the locking mechanism with the pulley of the differential, and the electromagnet assembly may be configured to rotate at least one of the projections of the locking mechanism in a second direction different from the first direction in response to the supplied power.

The differential may comprise: a sun gear fixed to the pulley; a first ring gear fixed to a housing of the electromechanical actuator package; a second ring gear configured to be rotatable and comprising the output connectable to the brake assembly; and planet gears supported by the first and second ring gears and the sun gear. The differential may not include a carrier for the planet gears. The planet gears may be disposed within the pulley and the first and second ring gears. The planet gears may be configured to be rotatable around the sun gear, and the second ring gear may be configured to be rotatable by the planet gears. Difference between the number of teeth of the first ring gear and the number of teeth of the second ring gear is the number of the planet gears. Each of the planet gears comprises a first portion operably associated with the fixed first ring gear and a second portion operably associated with the rotatable second ring gear.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
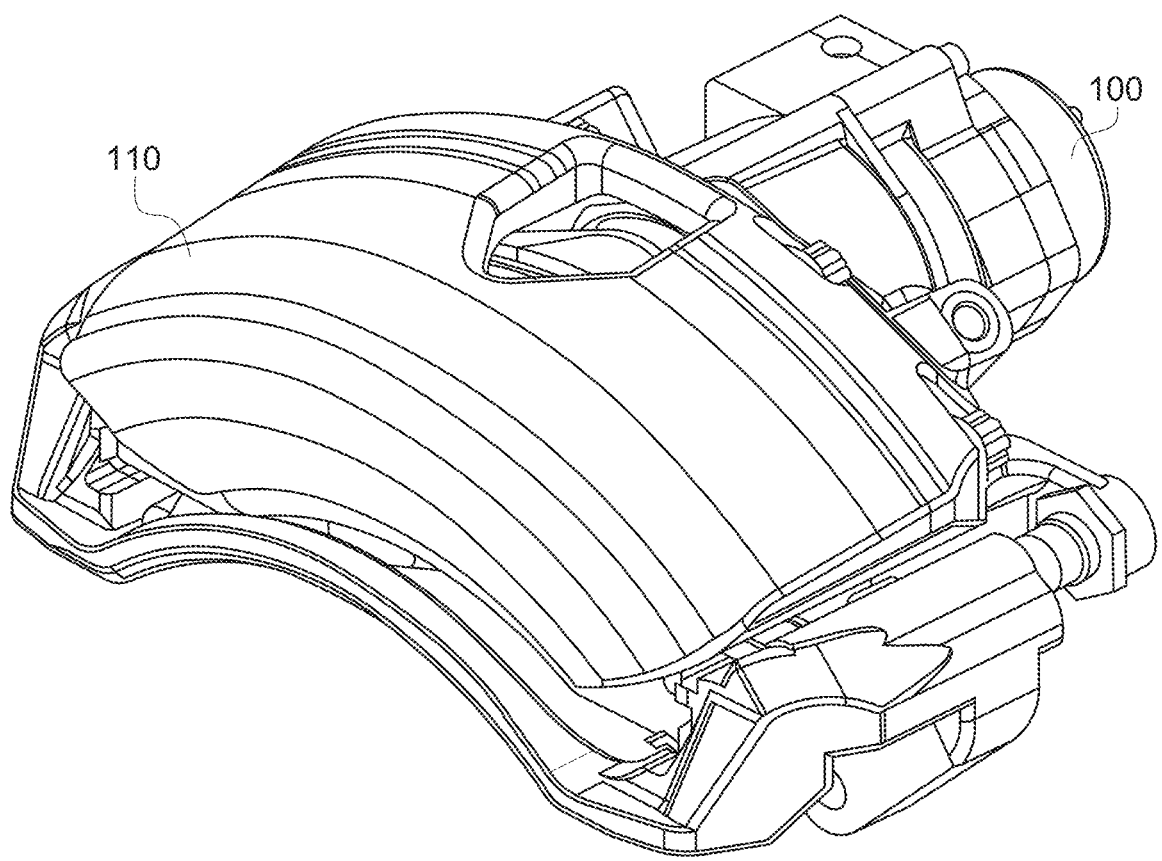
FIG. 1 shows a perspective view of an electromechanical actuator package coupled to a brake assembly according to an exemplary embodiment of the present disclosure.

FIG. 1 illustrates a perspective view of an electromechanical actuator package coupled to a brake assembly according to an embodiment of the present disclosure. As shown in FIG. 1, an electromechanical actuator package 100 may be directly mounted or indirectly connected to a brake assembly, for example, but not limited to, a brake caliper 110. The electromechanical actuator package 100 may be configured to actuate or drive the brake caliper 110. The electromechanical actuator package 100 can supply braking force to the brake caliper 110 through an actuator output 260 of FIG. 2. The electromechanical actuator package 100 may be coupled to the brake caliper 110 for applying the brakes using a variety of ways. For example, the actuator output 260 of FIG. 2 of the electromechanical actuator package 100 may be attached to a ball ramp or screw mechanism of the brake caliper 110 to generate axial force for actuating a brake. The electromechanical actuator package 100 may be mounted to any suitable portion of a vehicle, including frame, body, and trim components.

Figure 2:
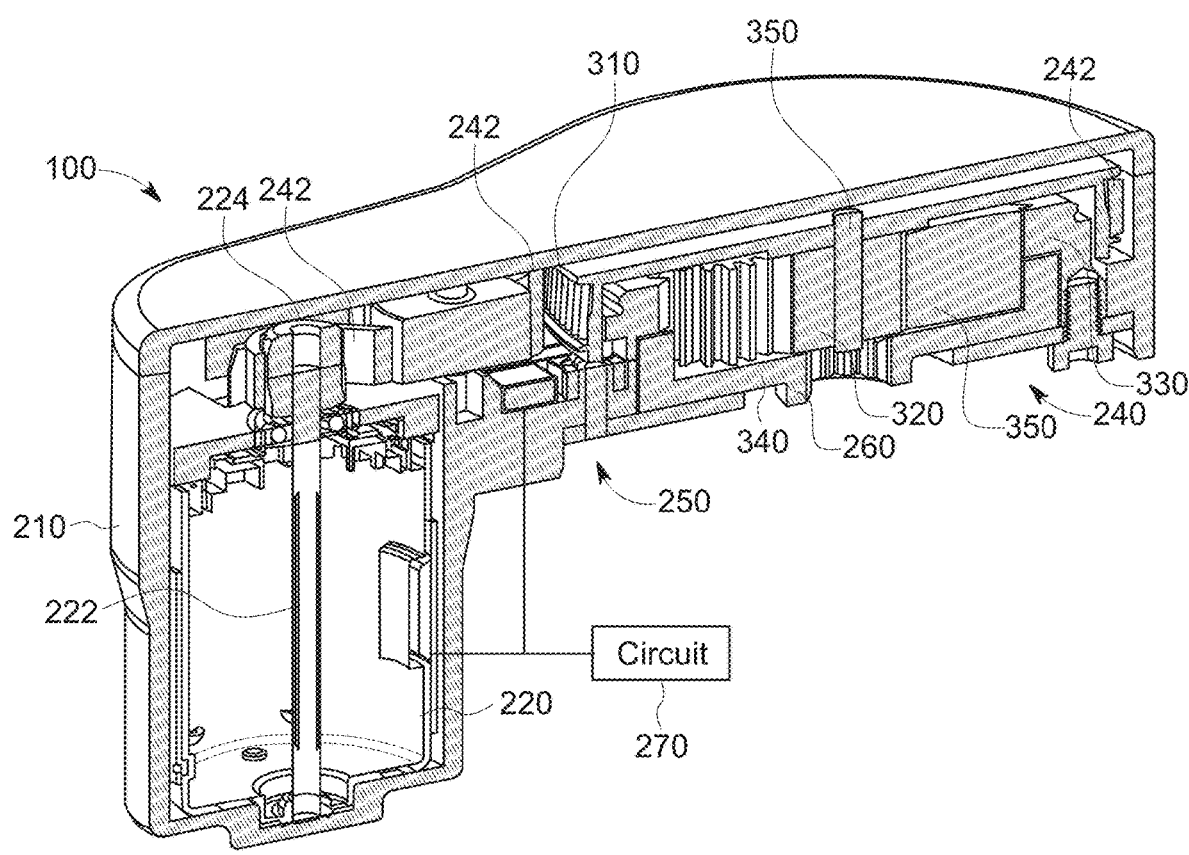
FIG. 2 shows a cross-sectional view of an electromechanical actuator package according to an exemplary embodiment of the present disclosure.

FIG. 2 shows a cross-sectional view of an electromechanical actuator package according to an exemplary embodiment of the present disclosure.

A motor 220 may be fixedly mounted in a housing 210. The motor 220 may be disposed in the tubular cavity formed in the housing 210 and be fixed to a lower part of the housing 210. The motor 220 may an electric motor, and includes a motor rotor shaft 222. The drive pulley 224 may be attached to the motor rotor shaft 222 or formed directly on the motor rotor shaft 222. The drive pulley 224 may have an outer surface that engages an inner surface of a drive belt 242. The outer surface of the drive pulley 224 can have any suitable contour or texture to help ensure a gripping contact between the drive belt 242 and the drive pulley 224. For example, the outer surface of the toothed pulley 224 and the inner surface of the drive belt 242 can include toothed mating protrusions and/or notches formed therein. The drive pulley 224 may have alternating teeth and grooves on its outer surface to be meshed with alternating grooves and teeth formed on the inner surface of the drive belt 242.

The drive pulley 224 of the motor rotor shaft 222 is rotatably engaged with a differential 240. The differential 240 may be configured to multiply torque from the motor 220 to supply braking force to the brake actuator 110, such as a brake caliper, via the actuator output 260.

In the exemplary embodiment of FIG. 2, the differential 240 may comprise a pulley 310, a sun gear 320, a first ring gear 330, a second ring gear 340, and planet gears 350.

The pulley 310 of the differential 240 may be a driven pulley. The drive pulley 224 of the motor rotor shaft 222 and the driven pulley 310 of the differential 240 are rotatably connected to each other via the drive belt 242. Each of the drive pulley 224 and the driven pulley 310 has an outer surface that engages an inner surface of the drive belt 242. The surfaces of the drive pulley 224 and the driven pulley 310 can have any suitable contour or texture to help ensure a gripping contact between the belt 242 and the pulleys 224, 310. For example, the surfaces of the pulleys 224 and 310 and the inner surface of the belt 242 can include toothed mating protruding and/or notches formed therein. The drive belt 242 is fit relatively snugly about the outer circumferences of the drive pulley 224 and the driven pulley 310. Thus, rotational movement of the drive pulley 224 of the motor rotor shaft 222 causes rotation of the driven pulley 310 of the differential 240. The diameters of the pulleys 224 and 310 can be any suitable dimension for providing any desired gear ratio, such that the rotational speed of the drive pulley 224 of the motor rotor shaft 222 is different from the rotational speed of the driven pulley 310 of the differential 240.

Alternatively, instead of the drive belt 242, the drive pulley 224 of the motor rotor shaft 222 and the driven pulley 310 of the differential 240 can be rotatably or operably connected to each other directly or through one or more gears and/or belts and/or combination thereof.

Figure 3A:
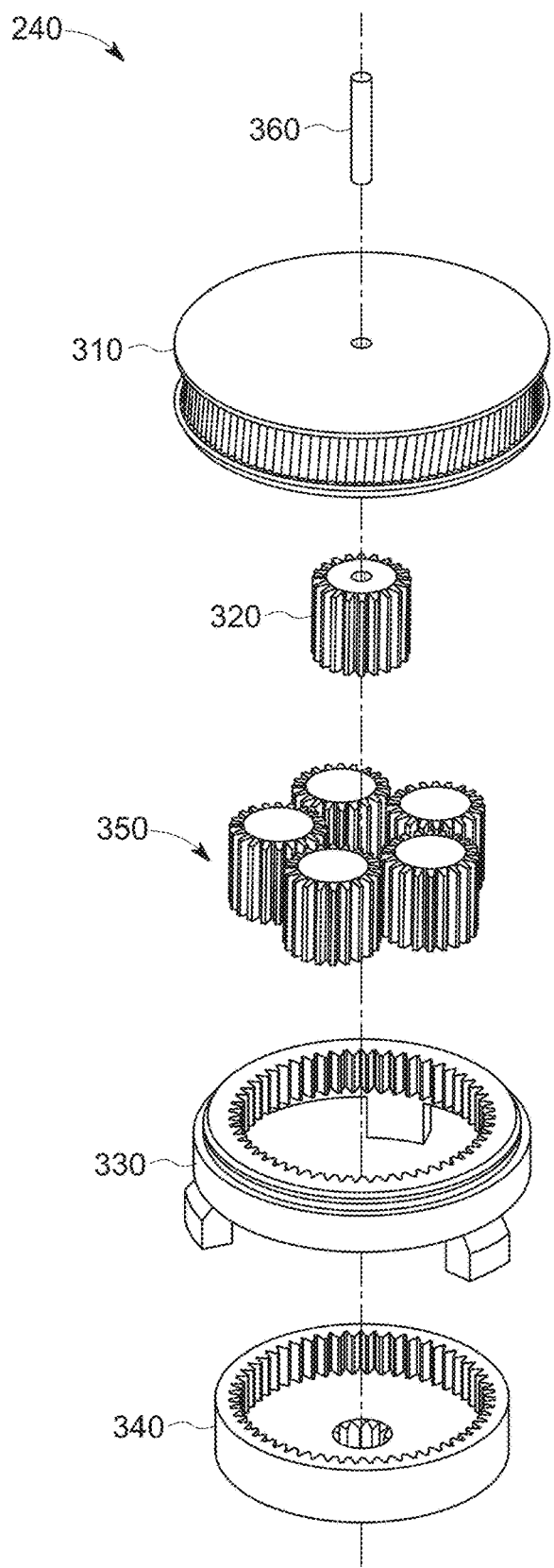
FIG. 3A shows an exploded view of a differential of an electromechanical actuator package according to an exemplary embodiment of the present disclosure.
Figure 3B:
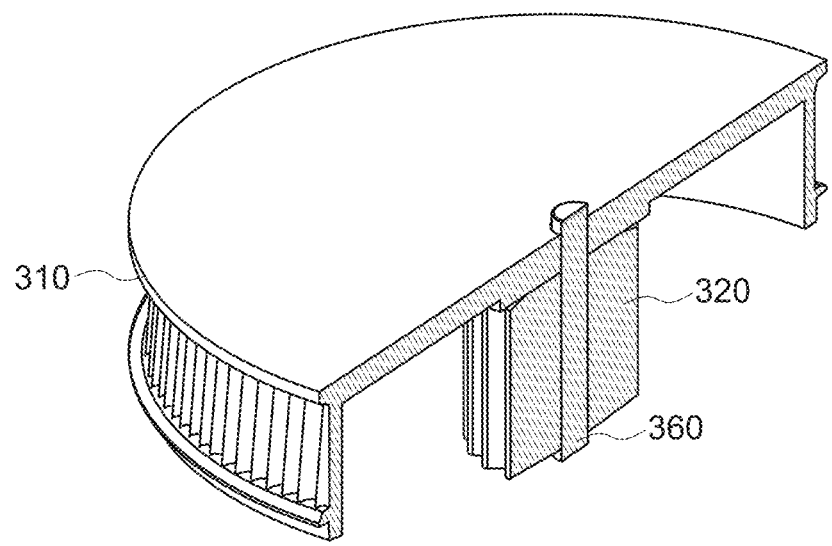
FIG. 3B shows a cross-sectional view of an assembly of a pulley and a sun gear of a differential of an electromechanical actuator package according to an exemplary embodiment of the present disclosure.
Figure 3C:
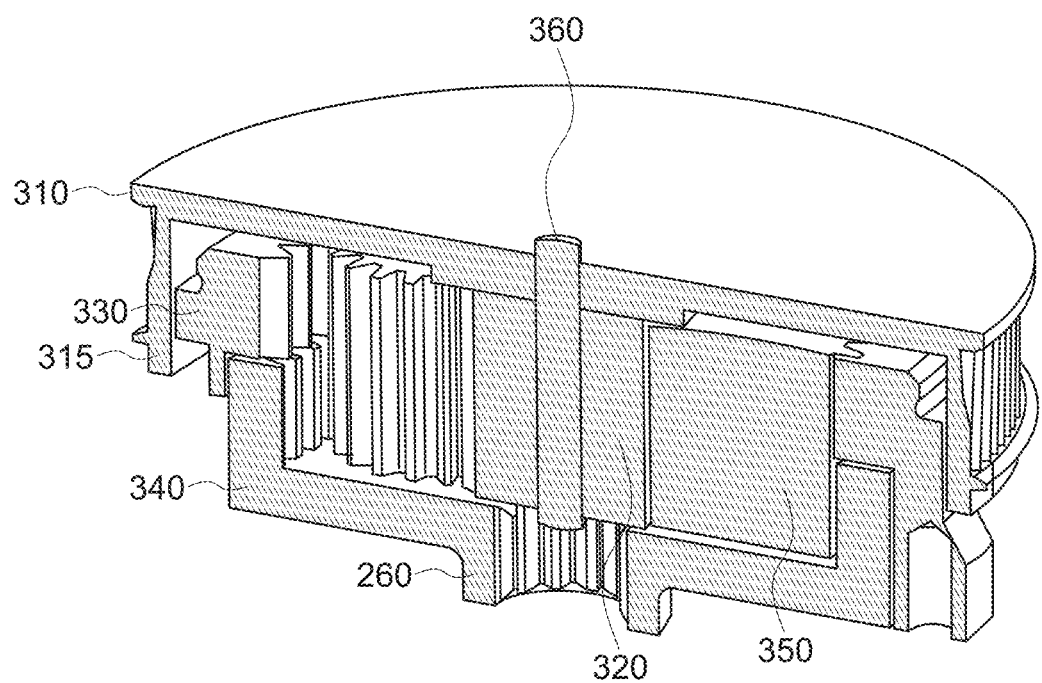
FIG. 3C shows a cross-sectional view of a differential of an electromechanical actuator package according to an exemplary embodiment of the present disclosure.

The sun gear 320 may be fixed to the pulley 310. For example, a pin axle 360 is press-fitted into the pulley 310 and the sun gear 320 to fixedly couple the sun gear 320 to the pulley 310 as shown in FIGS. 3B and 3C.

A plurality of planet gears 350 are driven by the sun gear 320. The planet gears 350 synchronize the first (or fixed) ring gear 330 with the second (or rotatable) ring gear 340. The planet gears 350 mesh or engage with the sun gear 320, the first (or fixed) ring gear 330 and the second (or rotatable) ring gear 340. The thickness of the planet gears 350 may be equal to or greater than the sum of the thickness of the first (or fixed) ring gear 330 and the thickness of the second (or rotatable) ring gear 340. Each of the planet gears 350 may comprise a first portion (e.g. an upper portion) operably associated with the fixed ring gear 330 and a second portion (e.g. a lower portion) operably associated with the rotatable ring gear 340.

The first or fixed ring gear 330 has internal teeth and may be fixedly coupled to the housing 210. Because the first ring gear 330 is fixed to the housing 210, the first ring gear 330 does not perform movable or rotatable operations in the differential 240. The first ring gear 330 can be fixedly connected to the housing 210 by any suitable manner, such as by one or more clips or snaps integrally formed in the first ring gear 330 and/or housing 210 or screws. The second or rotatable ring gear 340 has internal teeth and may be rotatably disposed in the housing 210. The difference between the number of teeth of the first ring gear 330 and the number of teeth of the second ring gear 340 may be the number of planet gears 350. Depending on necessary condition for the differential 240, the number of teeth of the first ring gear 330 may be greater than the number of teeth of the second ring gear 340. Alternatively, the number of teeth of the first ring gear 330 may be less than the number of teeth of the second ring gear 340.

An output cap 410 can be installed to the fixed ring gear 330 or the housing 210 under the rotatable ring gear 340 to cover the rotatable ring gear 340. The rotatable ring gear 340 is rotatably or movably disposed between the output cap 410 (or the housing 210) and the fixed ring gear 330.

Figure 4A:
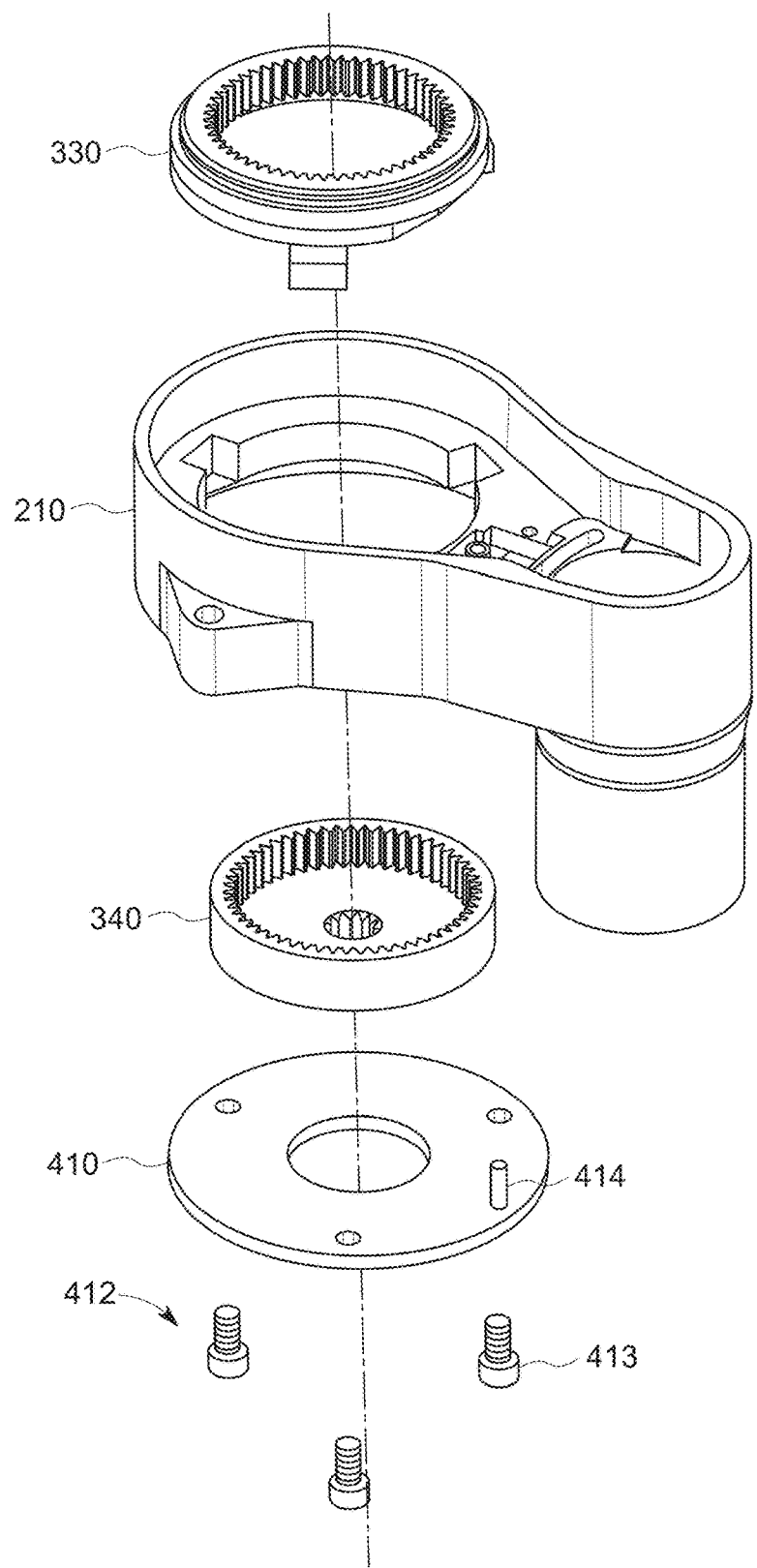
FIG. 4A shows an exploded view of an assembly of a housing and first and second ring gears of a differential of an electromechanical actuator package according to an exemplary embodiment of the present disclosure.
Figure 4B:
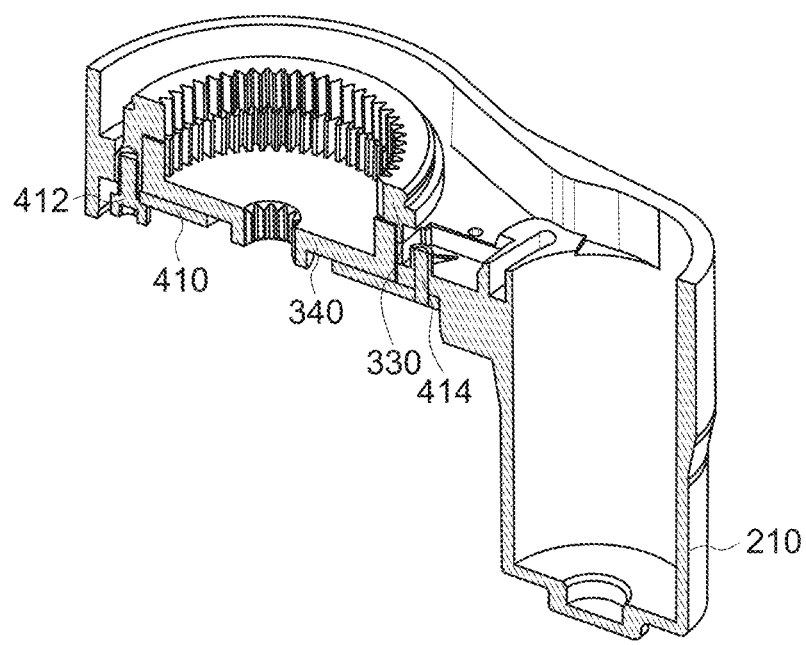
FIG. 4B shows a cross-sectional view of an assembly of a housing and fixed and rotatable ring gears of a differential of an electromechanical actuator package according to an exemplary embodiment of the present disclosure.
Figure 4C:
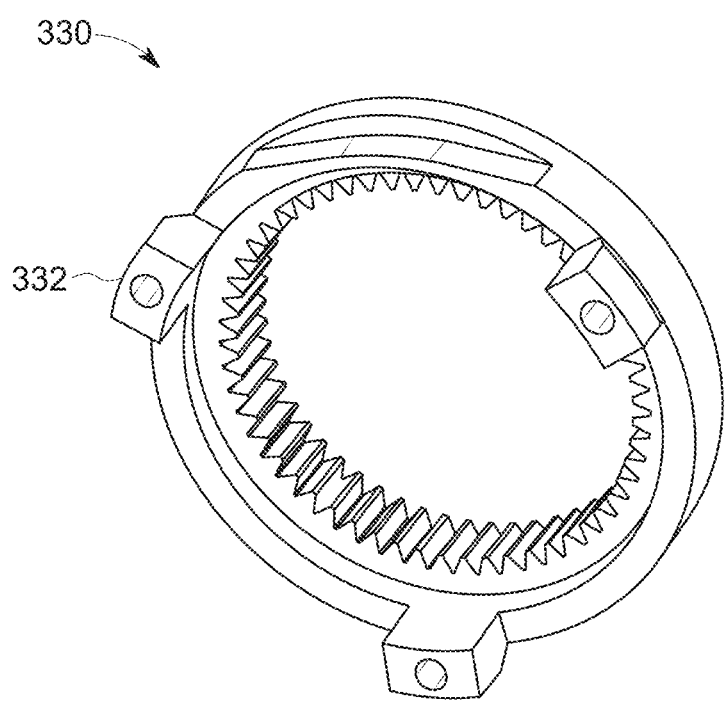
FIG. 4C shows a bottom perspective view of a fixed ring gear of a differential of an electromechanical actuator package according to an exemplary embodiment of the present disclosure.
Figure 4D:
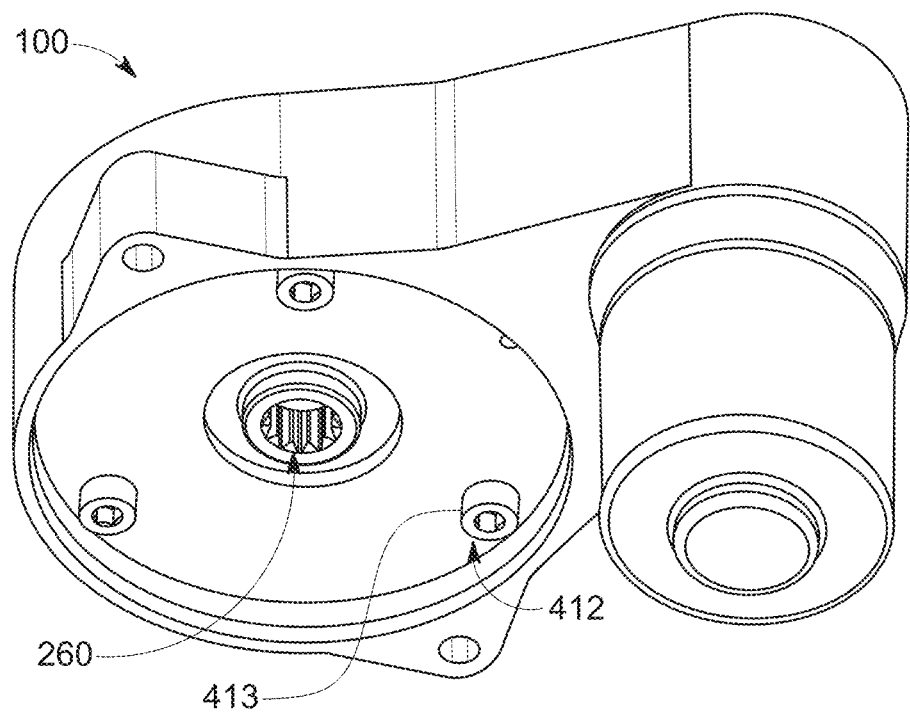
FIG. 4D shows a bottom perspective view of an electromechanical actuator package according to an exemplary embodiment of the present disclosure.

For example, the output cap 410 is fixedly coupled to the fixed ring gear 330 by bolts 412. The fixed ring gear 330 may have one or more legs 332 with tapped holes to fit the bolts 412 as shown in FIG. 4C. The bolts 412 may pass through holes formed in the output cap 410 and threaded into the holes of the legs 332 of the fixed ring gear 330.

Figure 4E:
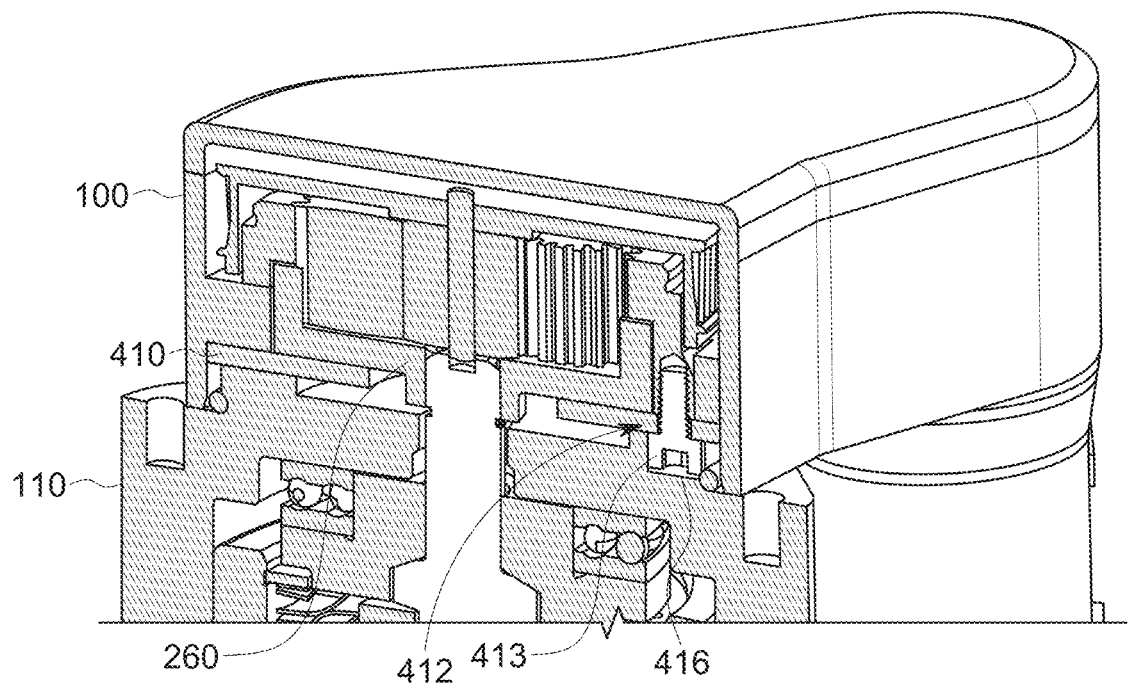
FIG. 4E shows a cross-sectional view of an electromechanical actuator package coupled to a brake assembly according to an exemplary embodiment of the present disclosure.

Heads 413 of the bolts 412 may fit in corresponding bores 416 formed at one side (e.g. back side) of a housing of the brake caliper 110 as shown in FIG. 4E. This may ensure that the torque supported while the vehicle is parked may be grounded or supported into the housing of the brake caliper 110 rather than through the housing 201 of the electromechanical actuator package 100 which may be made of plastic. In other words, the torque maintained during parking may be transmitted from the electromechanical actuator package 100 into the housing of the brake caliper 110 rather than through the housing 210 of the electromechanical actuator package 100. In addition, the output cap 410 may have a pin 414 inserted into a hole formed in the housing 201 to ensure correct orientation of the output cap 410.

The rotatable ring gear 340 may provide output torque of the planetary harmonic gear assembly of the differential 240. The rotatable ring gear 340 may be associated with the actuator output 260. The actuator output 260 may be formed directly (or molded) on a side of the rotatable ring gear 340 or fixedly coupled to the rotatable ring gear 340. The actuator output 260 may have various shapes that can be coupled to a part of the brake assembly 110. For example, the actuator output 260 may be formed as a protrusion extending from one side of the rotatable ring gear 340, such as a toothed, threaded or splined shaft to prevent or minimize rotational lash. Alternatively, the actuator output 260 may be formed as a toothed, threaded or splined bore that can receive a part of the brake assembly to prevent or minimize rotational lash. In the exemplary embodiment, the actuator output 260 of the electromechanical actuator package 100 may be attached to a ball ramp or screw mechanism of the brake caliper 110 to generate axial force for actuating a brake.

In operation, the motor 220 operably coupled to the driven pulley 310 rotates the driven pulley 310, and the sun gear 320 fixed to the driven pulley 310 is rotated together with the driven pulley 310. The sun gear 320 causes the planet gears 350 to rotate in the same direction as the sun gear 320, but at a reduced speed due to the fixed ring gear 330. The fixed ring gear 330 and the rotatable ring gear 340 may have different numbers of teeth, the difference being equal to the number of the planet gears 350. The difference in tooth numbers is achieved by modifying the operating pressure angles of the internal teeth so that the gear with fewer teeth (preferably the rotatable ring gear 340) engages at a high pressure angle than that with more teeth. Thus, as the planet gears 350 rotate, the teeth of the planet gears 350 engage with the teeth of the fixed ring gear 330 and the rotatable ring gear 340, and for each rotation of the planet gears 350, the rotatable ring gear 340 advances by the teeth which correspond to the number of the planet gears 350. Therefore, the overall ratio of the gear train is the ratio of speed of the sun gear 320 to the planet gears 350 multiplied by the number of teeth of the rotatable ring gear 340 divided by the number of the planet gears 350. For example, the sun gear 320 has 20 teeth, the planet gears 350 has nineteen (19) teeth, the fixed ring gear 330 has fifty five (55) teeth, and the rotatable ring gear 340 has sixty (60) teeth. At this example, the planetary gear stage gear ratio is 3.75:1, the harmonic gear stage gear ratio is 12:1, and the overall gear ratio is 45:1. The planetary harmonic gear assembly of the differential 240 may not need a carrier for the planet gears 350 because the planet gears 350 is operably connected with the sun gear 320 as well as the fixed ring gear 330 and the rotatable ring gear 340. Therefore, the efficiency of the planetary harmonic gear assembly of the differential 240 may be higher than conventional gear assemblies, such as a double planetary gear assembly. Additionally, the planet gears 350 may not need a hole for a shaft to be coupled to a carrier.

The number of the planet gears 350 may depend on the required torque output of the electromechanical actuator package 100. The rotatable ring gear 340 may have fewer internal teeth than the fixed ring gear 330. A high reduction ratio can be achieved by having fewer internal teeth on the rotatable ring gear 340 than on the fixed ring gear 330. Alternatively, the rotatable ring gear 340 may have more internal teeth than the fixed ring gear 330.

The planetary harmonic gear assembly of the differential 240 may have fewer components and can lower cost than conventional gear assemblies. Additionally, the gear assembly of the differential 240 may be axially compact and thin, and have high torque capacity due to the increased number of planet gears and high gear ratio in a small package.

The planetary stage gear ratio $GR_P$ is calculated by using Equation (1):

$$GR_P = (T_{R-F}/T_S) + 1 \qquad (1)$$

where $T_{R-F}$ is the number of teeth of the first (or fixed) ring gear 330, and $T_S$ is the number of teeth of the sun gear 320.

The harmonic stage gear ratio $GR_H$ is calculated by using Equation (2):

$$GR_H = T_{R-R}/|(T_{R-R} - T_{R-F})| \text{ where } T_{R-R} = T_{R-F} \pm N_P \qquad (2)$$

where $T_{R-R}$ is the number of teeth of the second (or rotatable) ring gear 340, $T_{R-F}$ is the number of teeth of the first (or fixed) ring gear 330, and $N_P$ is the number of the planet gears 350.

The gear ratio of the planetary harmonic gear assembly of the differential 240 $GR_{RHGS}$ is calculated by using Equation (3):

$$GR_{RHGS} = GR_P * GR_H \qquad (2)$$

where $GR_P$ is the planetary stage gear ratio and $GR_H$ is the harmonic stage gear ratio.

The output torque from the actuator output 260 of the electromechanical actuator package 100 may be adjusted or scalable depending on the specific force torque requirements by varying the torque of the motor 220, the diameters of the pulleys or gears, and/or the belt or gear reduction ratio. The reduction ratio (or 1/diameter ratio or speed ratio) between the drive pulley 224 of the motor rotor shaft 222 and the actuator output 260 may be equal to or greater than, for example, but not limited to, 1:25. According to some embodiments of the present disclosure, the planetary harmonic gear assembly of the differential 240 may improve mechanical efficiency as well as reduce the packaging size and mass.

A self-releasing type electromechanical parking brake mechanism may be made up of components that cannot self-lock during the parking brake operation. The self-releasing type electromechanical parking brake mechanism may allow a motion of the brake assembly 110 from the imposition of force or moment if the imposed force or moment exceeds a certain degree. A ball screw type brake assembly having a screw spindle and a nut integrated with balls, one example of the self-releasing type electromechanical parking brake mechanism, has low friction for maintaining the parking brake. Therefore, the self-releasing type electromechanical parking brake mechanism may require a mechanism to maintain the clamping force of the parking brake. A self-locking type electromechanical parking brake mechanism may also need supplemental force for maintaining the parking braking.

Figure 5A:
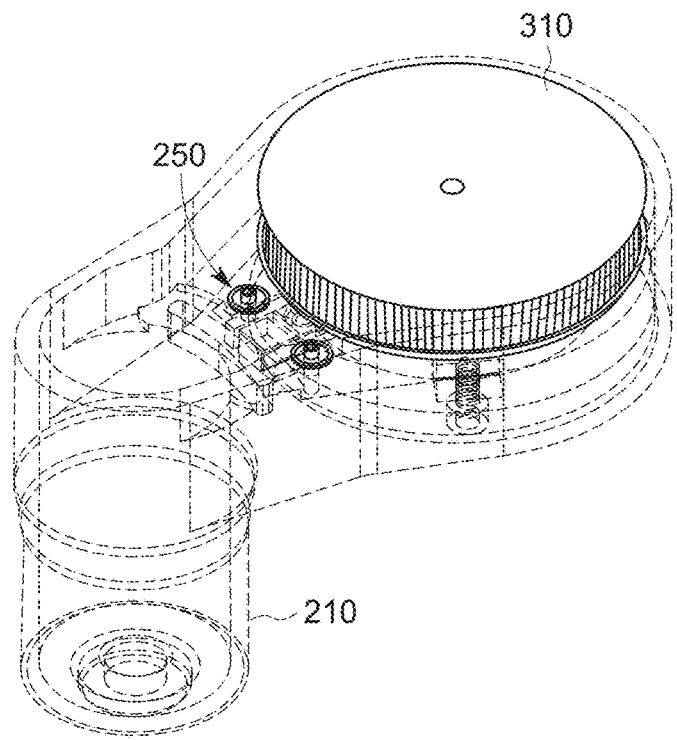
FIGS. 5A-5C show transparent and perspective views of an assembly of a locking mechanism, a housing and a pulley of an electromechanical actuator package according to an exemplary embodiment of the present disclosure.
Figure 5B:
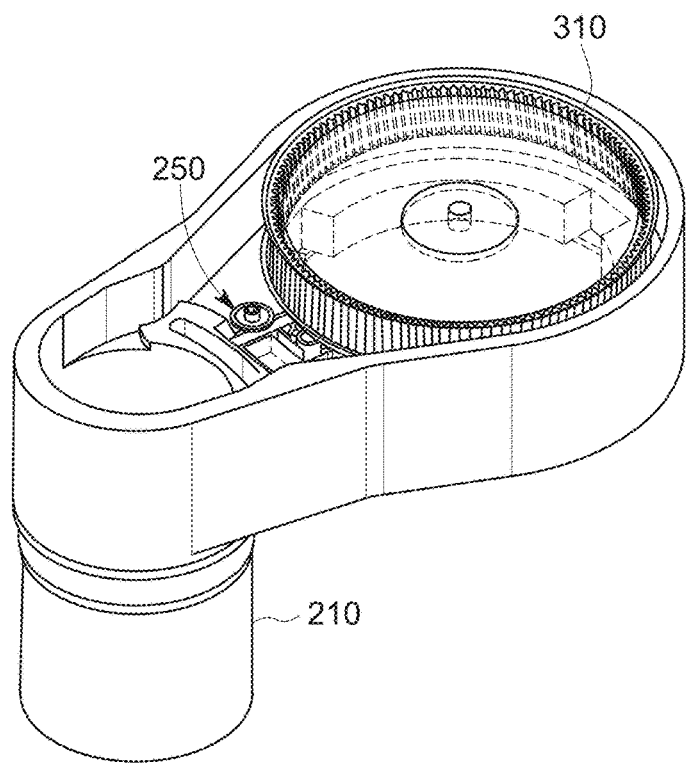
Figure 5C:
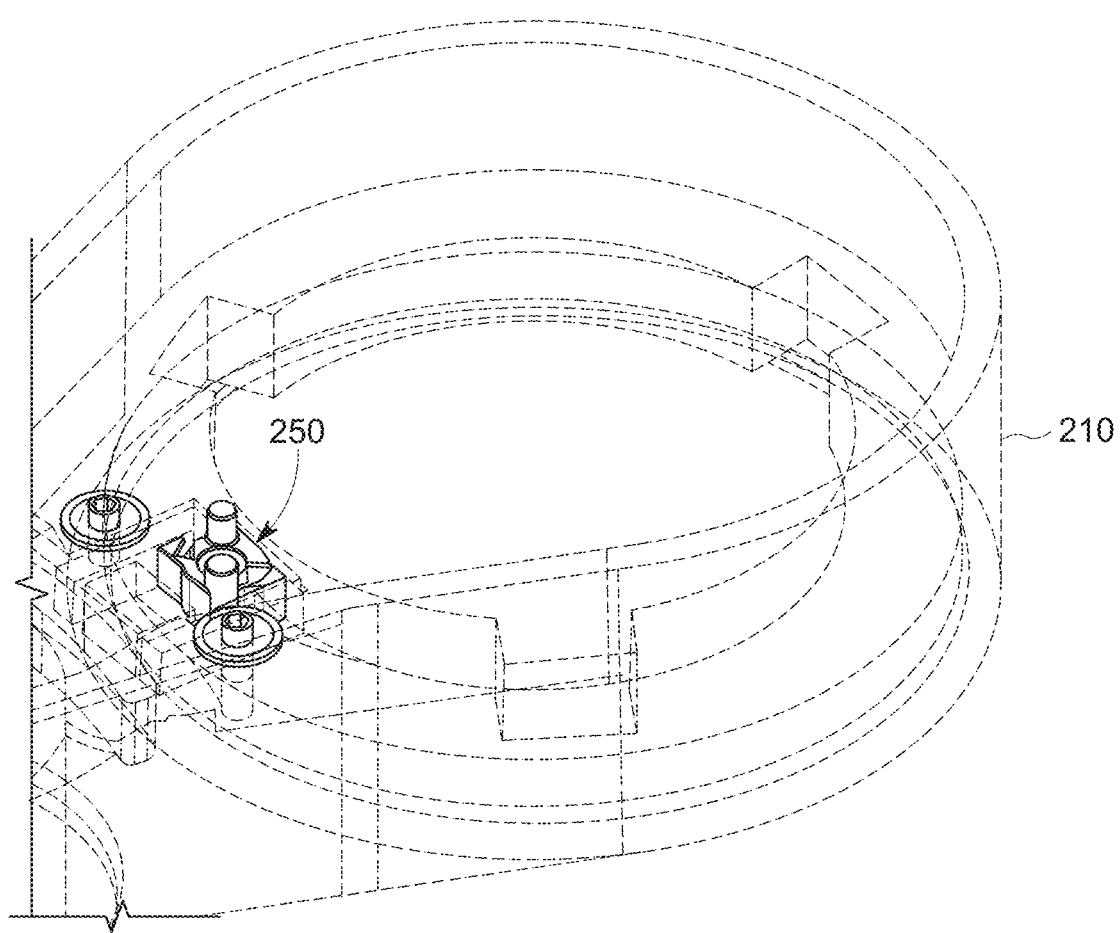
Figure 5D:
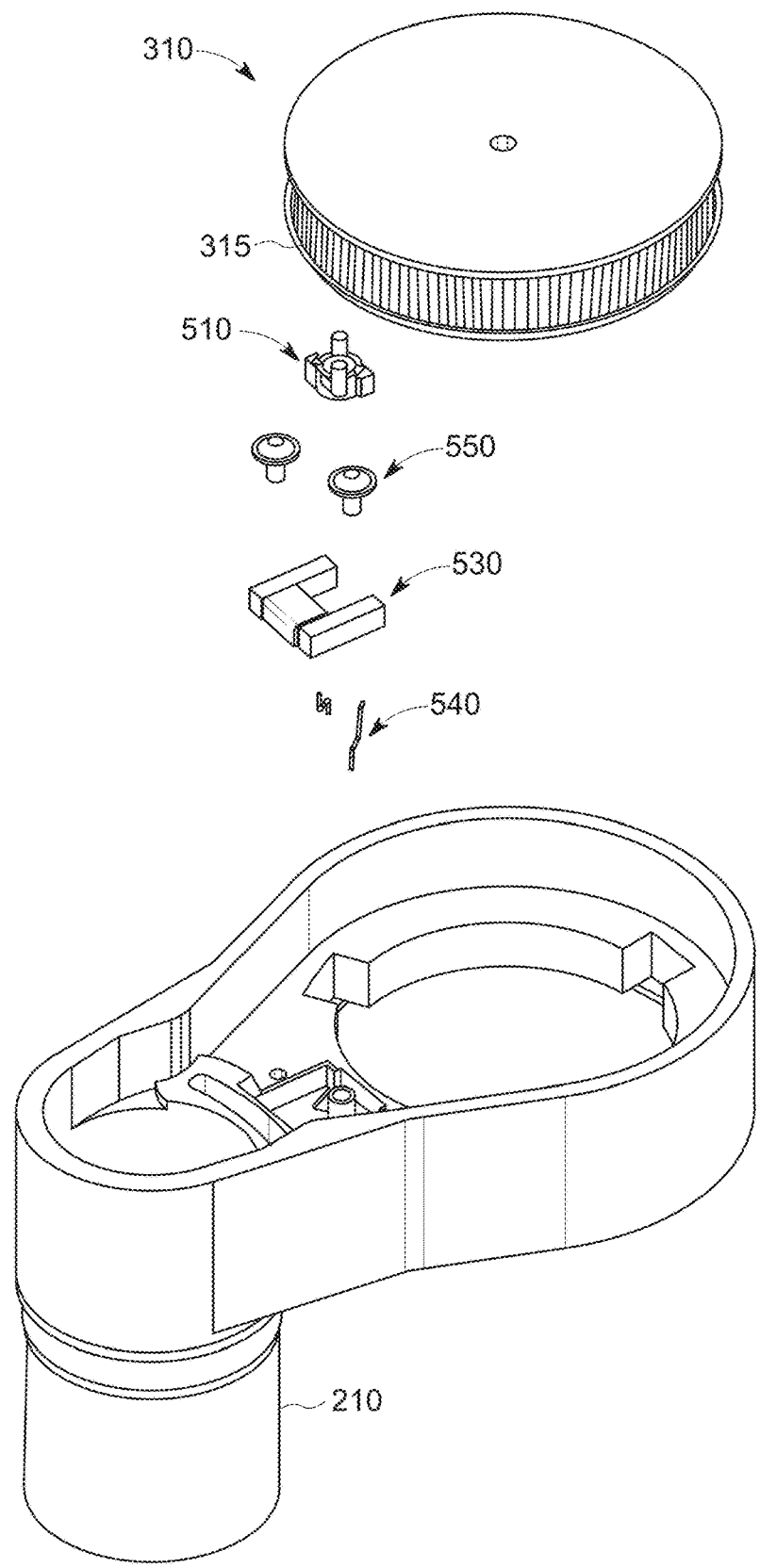
FIG. 5D shows an exploded view of an assembly of a locking mechanism, a pulley and a housing of an electromechanical actuator package according to an exemplary embodiment of the present disclosure.

According to some embodiments of the present disclosure, the electromechanical actuator package 100 may comprise a locking mechanism 250. The locking mechanism 250 may be configured to lock the differential 240. For example, the locking mechanism 250 may prevent the pulley 310 of the differential 240 from rotating if necessary, for example, but not limited, when a vehicle is parked. The locking mechanism 250 is positioned in the housing 210 of the electromechanical actuator package 100. For example, as shown in FIGS. 5A and 5B, the locking mechanism 250 is located under the pulley 310 of the differential 240.

The locking mechanism 250 may comprise a base 510 with a plurality of projections 520, an electromagnet assembly 530, and one or more springs 540.

The base 510 is configured to be movable in response to or in association with electromagnetic field generated by the electromagnet assembly 530 as well as restoring force provided by the springs 540. The base 510 is rotatably coupled to an axle 515 protruding from an inner surface of the housing 210, or fixed to the housing 210, and can rotate around the axle 515. For example, the axle 515 may be molded into the housing 210. The base 510 of the locking mechanism 250 is configured to be rotatable such that the rotation of the base 510 can cause the projections 520 of the base 510 to engage or disengage with the pulley 310 of the differential 240.

The projections 520 project from the rotatable base 510 toward the pulley 310 of the differential 240. For example, the projections 520 have pin shapes or any shape that can engage with the pulley 310 or can provide braking or locking torque to the pulley 310 when the projections 520 contact the pulley 310.

At least a part of the pulley 310 of the differential 240 is disposed between the projections 520. The projections 520 may be located or formed opposite sides of the rotatable base 510. For example, a first projection 521 is positioned outside of the pulley 310 of the locking mechanism 250 and a second projection 522 is positioned under (or above) the pulley 310 of the locking mechanism 250 such that a part of the pulley 310 of the differential 240 can be positioned between the first projection 521 and the second projection 522 of the locking mechanism 250. The closer the projections 520 are positioned to each other, the higher the braking or locking torque can be applied to the pulley 310. In the embodiment of the present disclosure, the pulley 310 of the differential 240 may have an extension 315 extended from a teethed portion of the pulley 310 toward the locking mechanism 250 so that the extension 315 of the pulley 310 can engage with the projections 520 of the rotatable base 510. The locking mechanism 250 may be located under the extension 315 of the pulley 310. The pulley 310 and/or the projections 520 are made of, for example, but not limited to, metal to prevent high wear.

Figure 6A:
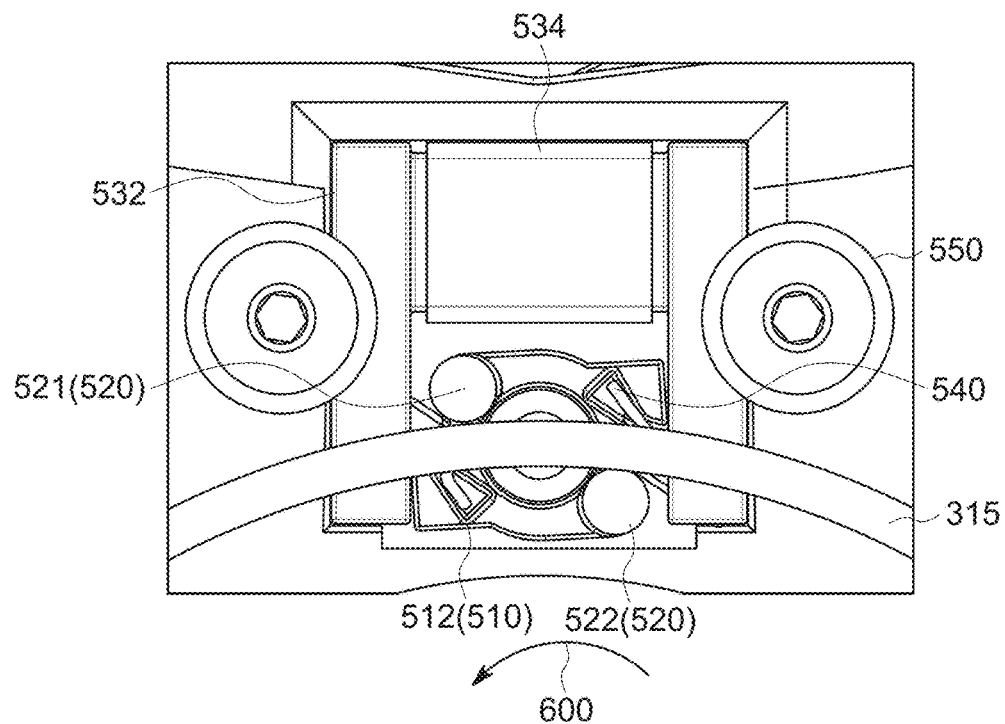
FIG. 6A shows an engaged state of a locking mechanism and a pulley of an electromechanical actuator package according to an exemplary embodiment of the present disclosure.
Figure 6B:
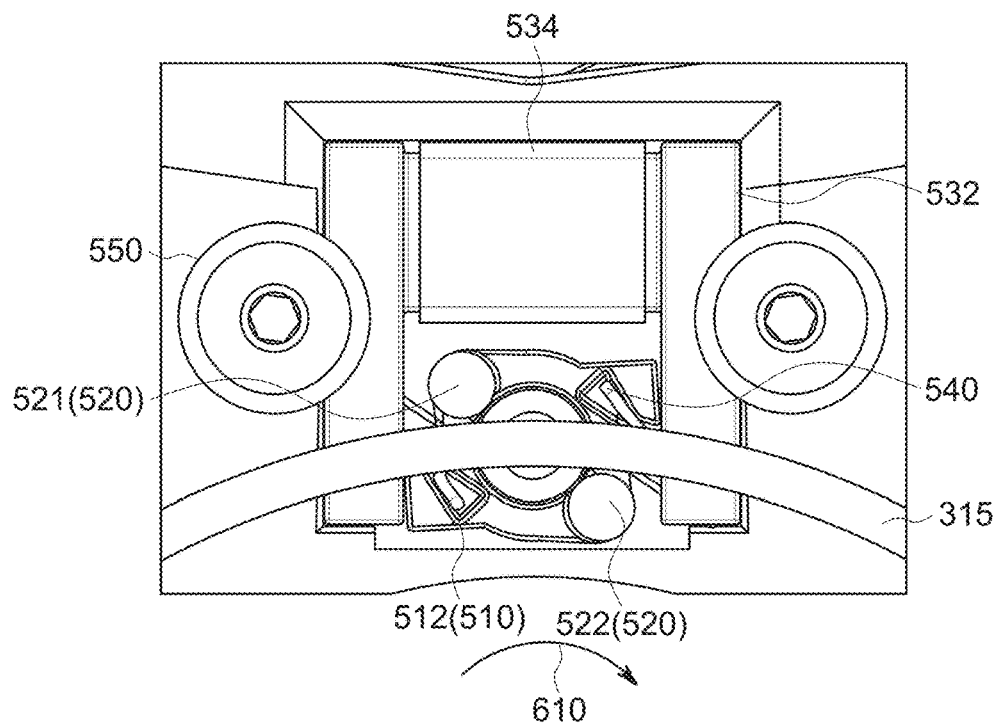
FIG. 6B shows a disengaged state of a locking mechanism and a pulley of an electromechanical actuator package according to an exemplary embodiment of the present disclosure.
Figure 6C:
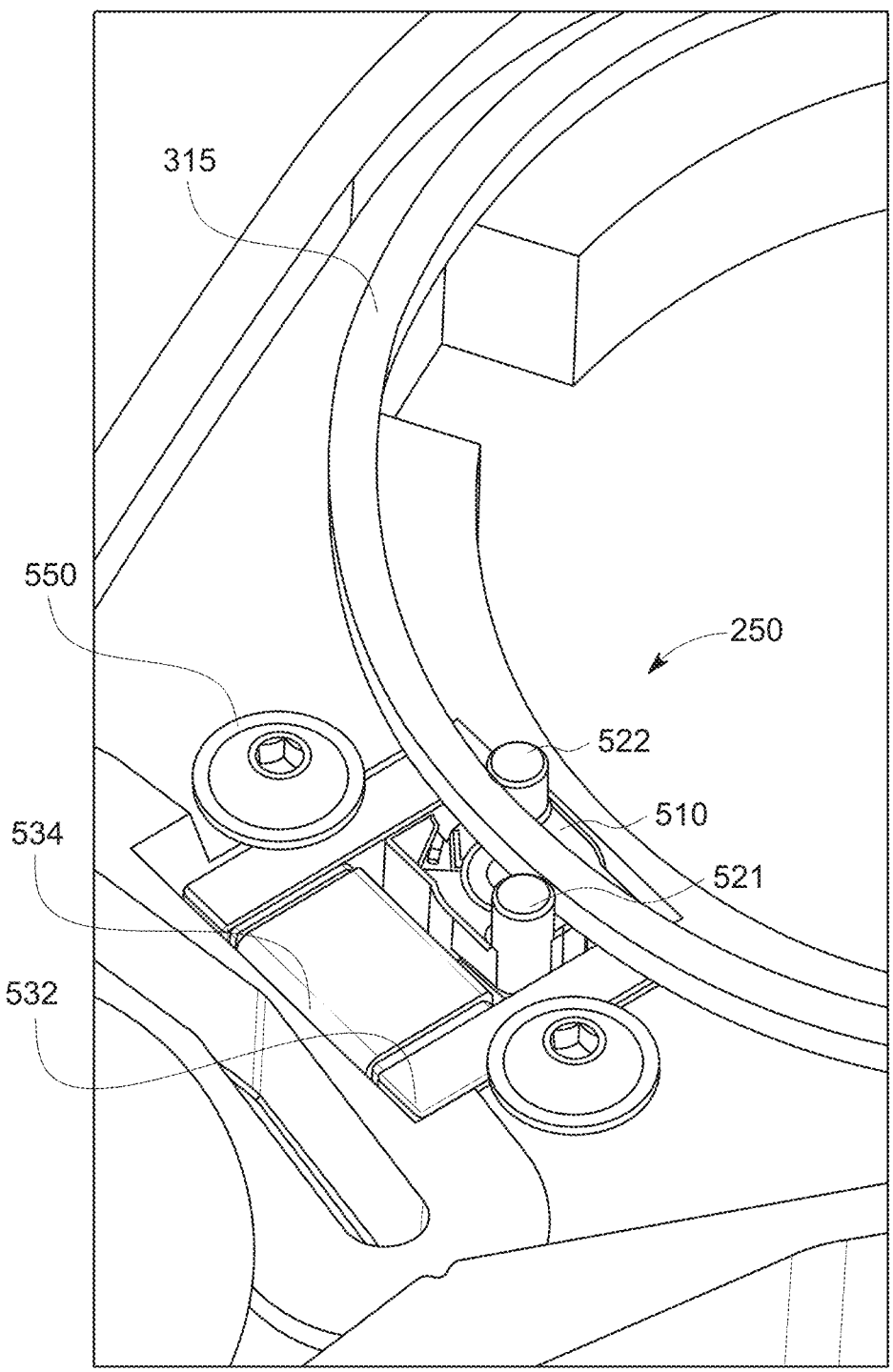
FIG. 6C shows a partial view of a locking mechanism and a pulley of an electromechanical actuator package according to an exemplary embodiment of the present disclosure.
Figure 7A:
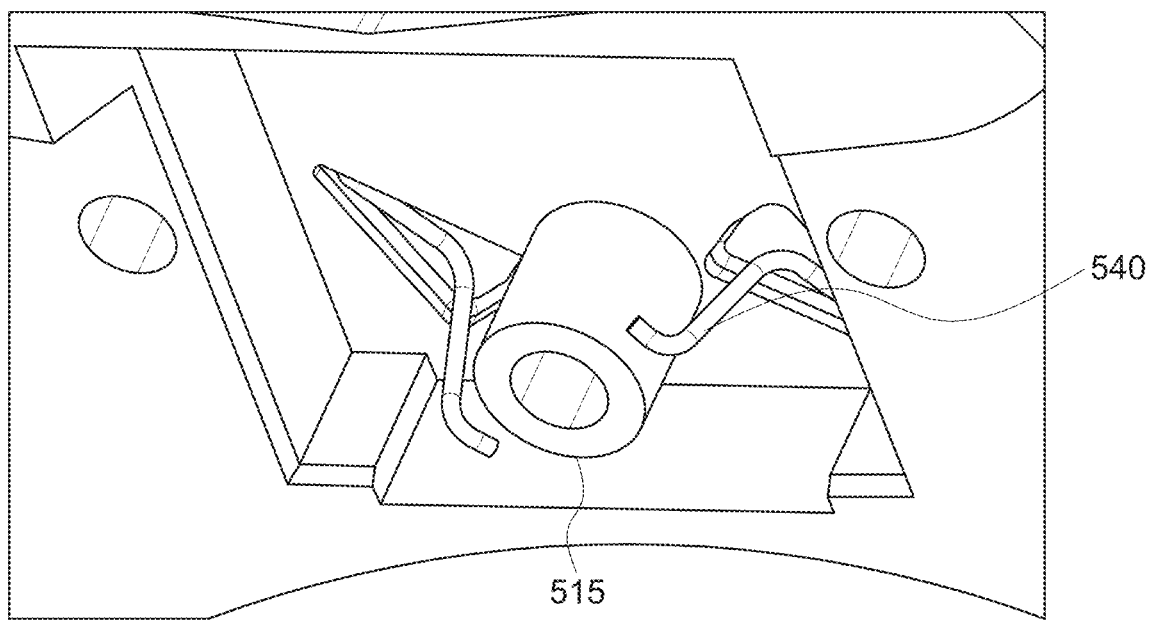
FIG. 7A shows a partial view of a housing with wire springs of an electromechanical actuator package according to an exemplary embodiment of the present disclosure.
Figure 7B:
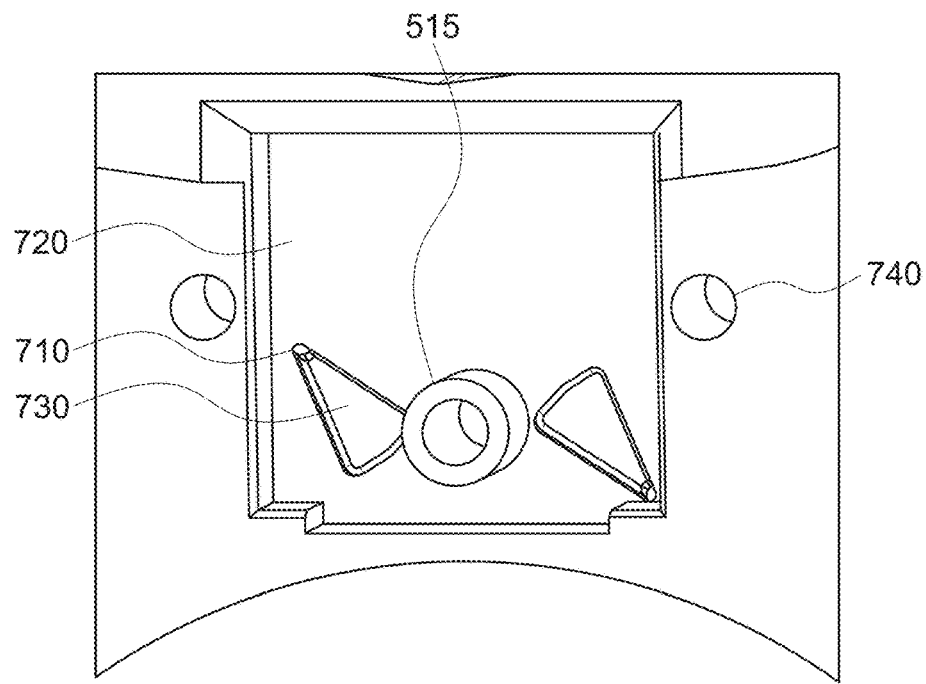
FIG. 7B shows a partial top view of a housing of an electromechanical actuator package according to an exemplary embodiment of the present disclosure.
Figure 7C:
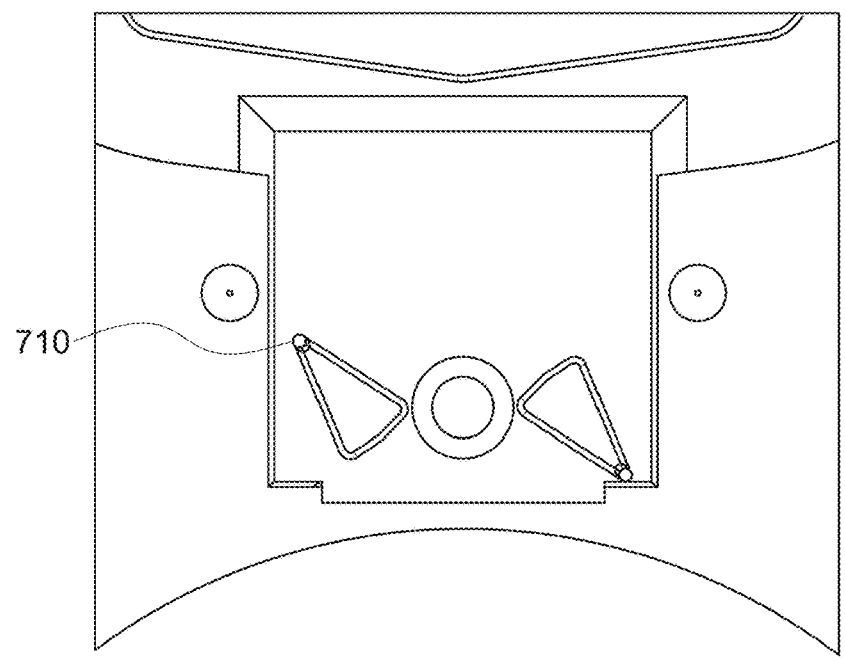
FIG. 7C shows a partial bottom view of a housing of an electromechanical actuator package according to an exemplary embodiment of the present disclosure.

One or more springs 540 may be operably coupled to the movable base 510 and/or at least one of the projections 520. For example, grooves 512 are formed on a surface of the base 510, and the springs 540 is coupled to a respective one of the grooves 512 of the base 510. Alternatively, the springs 540 can be coupled to a respective one of the projections 520. As shown in FIGS. 6A and 6B, one end of the spring 540 is inserted to the groove 512 of the rotatable base 510, and as illustrated in FIG. 7A, the other end of the spring 540 is coupled to a hole 710 of FIGS. 7B and 7C formed in the housing 210 of the electromechanical actuator package 100. The housing 210 has grooves or spaces 730 which allow the wire springs 540 to rotate between the engaged and disengaged positions of the rotatable base 510.

The springs 540 may be configured to urge at least one of the projections 520 toward the pulley 310 of the differential 240 to brake or lock the pulley 310 of the differential 240 when the electromagnet assembly 530 does not apply the electromagnetic field to the projections 520. For instance, the springs 540 are configured to rotate the base 510 and/or the projections 520 in a first direction 600 of FIG. 6A engaging the projections 520 with the pulley 310 of the differential 240. Accordingly, the springs 540 may force the projections 520 of the base 510 to come in contact with the pulley 310 of the differential 240 and rest on the extension 315 of the pulley 310 (normally engaged condition). Accordingly, when the circuit 270 does not supply the electrical power to the electromechanical actuator package 100, the locking mechanism 250 locks the differential 240 so that the actuator output 260 connected to the brake assembly 110 cannot be moved or rotated.

Figure 8A:
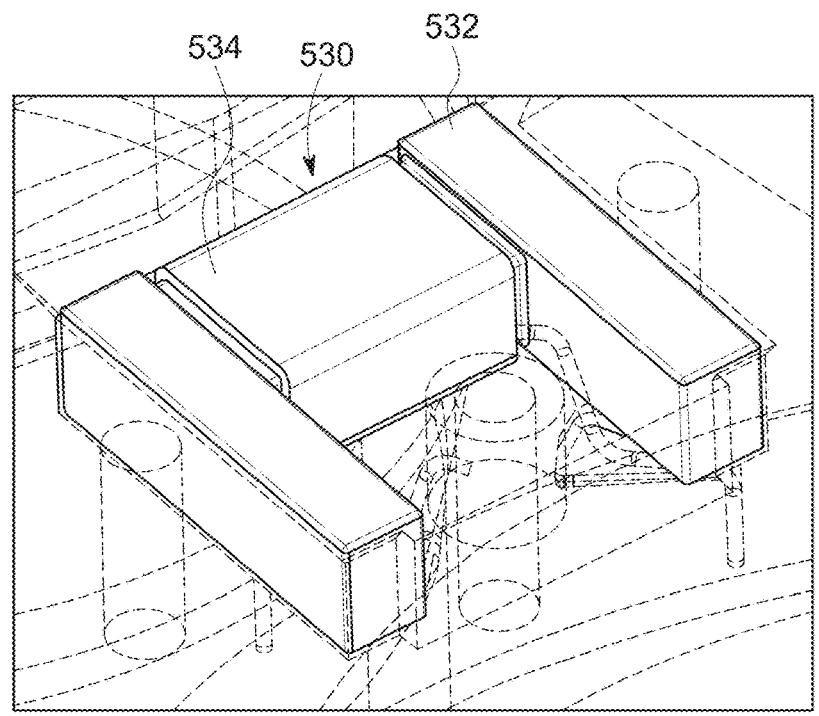
FIGS. 8A and 8B illustrate perspective views of an electromagnet assembly and a rotatable base mounted in a housing according to exemplary embodiments of the present disclosure.
Figure 8B:
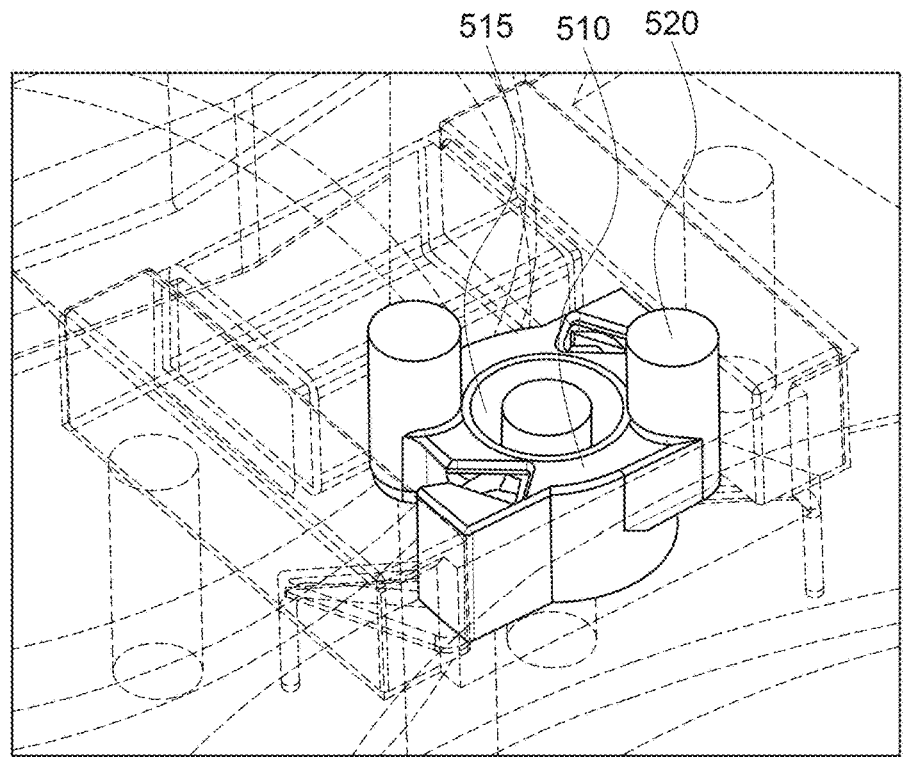

The electromagnet assembly 530 may be disposed adjacent to at least one of the projections 520 of the base 510. For instance, as shown in FIGS. 8A and 8B, the electromagnet assembly 530 is mounted in the housing 210 and located such that the electromagnet assembly 530 straddles the projections 520 of the rotatable base 510 on both sides. The electromagnet assembly 530 may comprise a core 532 and a coil 534. The core 532 of the electromagnet assembly 530 may be made of metal. The core 532 of the electromagnet assembly 530 may have two or more arms, and the projections 520 of the base 510 may be positioned between the arms of the core 534 of the electromagnet assembly 530. The coil 534 may be wound at the middle of the core 532.

The electromagnet assembly 530 is operably associated with at least one of the projections 520 of the base 510. The electromagnet assembly 530 is configured to generate the electromagnetic field which forces to rotate the projections 520 of the rotatable base 510 in a second direction 610 of FIG. 6B to overcome the restoring force of the springs 540 so that the projections 520 contacting the pulley 310 can be disengaged from the pulley 310. The electronic magnetic field generated by the electromagnet assembly 530 can move at least one of the projections 520 away from the pulley 310 of the differential 240 against the force of the springs 540. Accordingly, the electromagnet assembly 530 can rotate the base 510 and/or the at least one of the projections 520 in the second direction 610 to disengage at least one of the projections 520 of the locking mechanism 250 from the pulley 310 of the differential 240, and therefore the electromechanical actuator package 100 and the brake assembly 110 can be released from the locking state.

For example, as shown in FIG. 2, the electromagnet assembly 530 is wired in parallel with the motor 220. The circuit 270 is electrically connected to a wire connecting the electromagnet assembly 530 and the motor 220 so that the circuit 270 supplies or cuts the power to the electromagnet assembly 530 and the motor 220 at the same time. Accordingly, when the circuit 270 supplies the power, the motor 220 is actuated and the electromagnet assembly 530 is turned on. When the circuit 270 does not supply the power, both the motor 220 and the electromagnet assembly 530 are turned off.

The circuit 270 may comprise any suitable circuitry and electronic components, such as a microprocessor, mounted thereon. The circuit 270 may be located inside or outside of the housing 210 of the electromechanical actuator package 100. The circuit 270 may be configured to control the motor 220 and the electromagnet assembly 530, for example, but not limited to, supply power to the motor 220 and the electromagnet assembly 530, activate or deactivate the operation of the motor 220 and the electromagnet assembly 530, and vary the speed of the motor 220 and/or the rotational direction of the motor 220.

In operation, when the circuit 570 does not supply the power to the electromagnet assembly 530, the electromagnet assembly 530 does not generate the electronic magnet field applied to the projections 520 of the base 510 and the springs 540 urge the rotatable base 510 in the first direction 600 so that the projections 520 of the base 510 are engaged with the pulley 310 of the differential 240 as shown in FIG. 6A. The engagement of the projections 520 of the base 510 and the pulley 310 of the differential 240 by the force of the springs 540 can prevent the rotation of the pulley 310 of the differential 240 in the second direction 610 and therefore lock the brake assembly 110 coupled to the output 260 of the differential 240. When the circuit 570 supplies the power to the electromagnet assembly 530, the electromagnet assembly 530 generates and applies the electromagnetic field to the projections 520 of the rotatable base 510 and rotates the rotatable base 210 with the projections 520 in the second direction 610 so that the projections 520 of the base 510 are disengaged from the pulley 310 of the differential 240 as shown in FIG. 6B. The electromagnet assembly 530 releases the locking state of the pulley 310 of the differential 240.

In an assembly process of the electromechanical actuator package 100, the springs 540 are inserted into the holes 710 formed in the housing 210. Next, the electromagnet assembly 530 is installed in the seat 720 formed in the housing 210 such that the springs 540 are disposed between the arms of the core 532 of the electromagnet assembly 530. Then, mounting bolts 550 are screwed into mounting holes 740 of the housing 210 to fix the electromagnet assembly 530 to the housing 210. The rotatable base 510 with the projections 520 is inserted on the axle 515 molded or inserted into the housing 210, and one end of the spring 540 is put in the groove 512 of the base 510. Prior to assembling the pulley 310 into the electromechanical actuator package 100, the operation of the electromagnet assembly 530 may need to be checked. For example, when the electromagnet assembly 530 is powered, the rotatable base 510 need to be rotated in the second direction 610 in response to the electromagnet field generated by the electromagnet assembly 530 to release from the lock by the springs 540.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. An electromechanical actuator package for actuating a brake assembly configured to operate a vehicle brake, the electromechanical actuator package comprising:
   a motor;
   a differential operably connected to the motor, the differential comprising a pulley and an output connectable to the brake assembly; and
   a locking mechanism configured to lock the pulley the locking mechanism comprising:
   a rotatable base configured to be rotatable such that rotation of the base causes the first and second projections of the locking mechanism to engage or disengage with the pulley,
   a plurality of projections projecting from the rotatable base, the projections comprising a first projection and a second projection, wherein at least a part of the pulley is positioned between the first and second projections projected from the rotatable base, the first projection of the locking mechanism is positioned outside of the pulley and at least a part of the second projection of the locking mechanism is positioned inside of the pulley,
   an electromagnet assembly disposed adjacent to at least one of the projections, the electromagnet assembly operably associated with at least one of the projections, and
   one or more springs operably coupled to the rotatable base and/or at least one of the projections.

2. The electromechanical actuator package of claim 1, wherein the one or more springs are configured to urge at least one of the projections toward the pulley.

3. The electromechanical actuator package of claim 1, wherein the electromagnet assembly is configured to move at least one of the projections away from the pulley by applying electromagnetic field to at least one of the projections.

4. The electromechanical actuator package of claim 1, wherein the one or more springs are configured to rotate the rotatable base and/or at least one of the projections in a first direction engaging at least one of the projections with the pulley.

5. The electromechanical actuator package of claim 4, wherein the electromagnet assembly is configured to rotate the rotatable base and/or the at least one of the projections in a second direction different from the first direction to disengage at least one of the projections from the pulley.

6. The electromechanical actuator package of claim 1, wherein one end of one of the springs is coupled to a groove formed on the rotatable base of the locking mechanism and an other end of the one of the springs is coupled to a hole formed in a housing of the electromechanical actuator package.

7. The electromechanical actuator package of claim 1, further comprising a circuit configured to supply power to the electromagnet assembly,
   wherein:
   the one or more springs are configured to rotate the base or at least one of the projections of the locking mechanism in a first direction engaging at least one of the projections of the locking mechanism with the pulley, and
   the electromagnet assembly is configured to rotate at least one of the projections of the locking mechanism in a second direction different from the first direction in response to the supplied power.

8. The electromechanical actuator package of claim 1, wherein the electromagnet assembly is electrically wired in parallel with the motor.

9. The electromechanical actuator package of claim 1, wherein the differential comprises:
   a sun gear fixed to the pulley;
   a first ring gear fixed to a housing of the electromechanical actuator package;
   a second ring gear configured to be rotatable and comprising the output connectable to the brake assembly; and
   planet gears supported by the first and second ring gears and the sun gear.

10. The electromechanical actuator package of claim 9, wherein the differential does not include a carrier for the planet gears.

11. The electromechanical actuator package of claim 9, wherein the planet gears are disposed within the pulley and the first and second ring gears.

12. The electromechanical actuator package of claim 9, wherein:
    the planet gears are configured to be rotatable around the sun gear, and
    the second ring gear is configured to be rotatable by the planet gears.

13. The electromechanical actuator package of claim 9, wherein a difference between the number of teeth of the first ring gear and the number of teeth of the second ring gear is the number of the planet gears.

14. The electromechanical actuator package of claim 9, wherein each of the planet gears comprises a first portion operably associated with the first ring gear and a second portion operably associated with the second ring gear.

15. An electromechanical actuator package for actuating a brake assembly configured to operate a vehicle brake, the electromechanical actuator package comprising:
    a motor;
    a differential operably connected to the motor, the differential comprising a pulley and an output connectable to the brake assembly; and
    a locking mechanism configured to lock the pulley, the locking mechanism comprising:
    a base configured to be movable,
    a plurality of projections projecting from the movable base, the projections comprising a first projection and a second projection, wherein at least a part of the pulley is positioned between the first and second projections projected from the movable base, an electromagnet assembly disposed adjacent to at least one of the projections, the electromagnet assembly operably associated with at least one of the projections, and one or more springs operably coupled to the movable base and/or at least one of the projections, wherein the electromagnet assembly comprises a core and a coil, and the core of the electromagnet assembly comprises arms, and at least one of the projections is positioned between the arms of the core of the electromagnet assembly.

16. An electromechanical actuator package for actuating a brake assembly configured to operate a vehicle brake, the electromechanical actuator package comprising:
a differential comprising:
a pulley,
a sun gear around which planet gears are revolvable, the sun gear fixed to the pulley,
a first ring gear fixed to a housing of the electromechanical actuator package,
a second ring gear having teeth protruding from an inner circumferential surface of the second ring gear and configured to be rotatable and comprising an output connectable to the brake assembly, and
the planet gears supported by the first and second ring gears and the sun gear; and
a locking mechanism configured to lock the pulley, the locking mechanism comprising:
a base configured to be movable,
a plurality of projections projecting from the movable base, the projections comprising a first projection and a second projection, wherein at least a part of the pulley is positioned between the first and second projections projected from the movable base,
an electromagnet assembly disposed adjacent to at least one of the projections, the electromagnet assembly operably associated with at least one of the projections, and
one or more springs operably coupled to the movable base and/or at least one of the projections.

17. The electromechanical actuator package of claim 16, wherein the differential does not include a carrier for the planet gears.

18. The electromechanical actuator package of claim 16, wherein: the second ring gear is configured to be rotatable by the planet gears.

19. The electromechanical actuator package of claim 16, wherein the planet gears are disposed within the pulley and the first and second ring gears.

* * * * *